United States Patent [19]
Mannava et al.

[11] Patent Number: 5,675,892
[45] Date of Patent: Oct. 14, 1997

[54] LASER SHOCK PEENING FOR GAS TURBINE ENGINE VANE REPAIR

[75] Inventors: Seetharamaiah Mannava; Stephen J. Ferrigno, both of Cincinnati, Ohio

[73] Assignee: General Electric Company, Cincinnati, Ohio

[21] Appl. No.: 668,642

[22] Filed: Jun. 20, 1996

Related U.S. Application Data

[62] Division of Ser. No. 399,321, Mar. 6, 1995, abandoned.

[51] Int. Cl.⁶ ................................................. B23P 15/00
[52] U.S. Cl. .......................................... 29/889.1; 29/889.7
[58] Field of Search ............................ 29/889.1, 889.7; 219/121.65, 121.66; 416/223 A, 241 R

[56] References Cited

U.S. PATENT DOCUMENTS

| | | |
|---|---|---|
| 3,566,662 | 3/1971 | Champoux . |
| 3,689,176 | 9/1972 | Howell et al. . |
| 3,850,698 | 11/1974 | Mallozzi et al. . |
| 4,002,403 | 1/1977 | Mallozzi et al. . |
| 4,050,133 | 9/1977 | Cretella et al. . |
| 4,060,769 | 11/1977 | Mallozzi et al. . |
| 4,121,894 | 10/1978 | Cretella et al. . |
| 4,176,433 | 12/1979 | Lee et al. . |
| 4,285,459 | 8/1981 | Baladjanian et al. . |
| 4,401,477 | 8/1983 | Clauer et al. . |
| 4,557,033 | 12/1985 | Champoux . |
| 4,705,203 | 11/1987 | McComas et al. . |
| 4,934,170 | 6/1990 | Easterbrook et al. . |
| 4,937,421 | 6/1990 | Ortiz, Jr. et al. . |
| 5,127,019 | 6/1992 | Epstein et al. . |
| 5,131,957 | 7/1992 | Epstein et al. . |
| 5,142,778 | 9/1992 | Smolinski et al. . |
| 5,185,924 | 2/1993 | Fraser . |
| 5,226,785 | 7/1993 | Narayana et al. . |
| 5,245,155 | 9/1993 | Pratt et al. . |
| 5,269,057 | 12/1993 | Mendham . |
| 5,273,204 | 12/1993 | Dalal et al. . |
| 5,306,360 | 4/1994 | Bharti et al. . |
| 5,307,622 | 5/1994 | Ciokajlo et al. . |

*Primary Examiner*—Irene Cuda
*Attorney, Agent, or Firm*—Andrew C. Hess; Nathan D. Herkamp

[57] ABSTRACT

A wide gap braze repair, particularly for a gas turbine engine vane or a component in the hot section of the engine. The repair is characterized by a braze filled void in a damaged area of the component, a laser shock peened surface over the repaired area of the braze filled void, and a region of deep compressive residual stresses imparted by laser shock peening (LSP) extending from the laser shock peened surface into the repair.

2 Claims, 2 Drawing Sheets

LASER SHOCK PEENING FOR GAS TURBINE ENGINE VANE REPAIR

This application is a division of application Ser. No. 08/399,321, filed Mar. 6, 1995 now abandoned.

RELATED PATENT APPLICATIONS

The present Application deals with related subject matter in co-pending U.S. patent application Ser. Nos. 08/319,346, entitled "LASER SHOCK PEENED ROTOR COMPONENTS FOR TURBOMACHINERY", Ser. No. 08/373,133, entitled "LASER SHOCK PEENED FAN BLADE EDGES", Ser. No. 08/362,362, entitled "ON THE FLY LASER SHOCK PEENING", filed Dec. 22, 1994, and U.S. patent application Ser. No. 08/399,285, entitled "LASER SHOCK PEENED GAS TURBINE ENGINE COMPRESSOR BLADE EDGES", filed December 1994.

BACKGROUND OF THE INVENTION

1. Field of the Invention

This invention relates to gas turbine engine turbine vane repair and, more particularly, to turbine vane with gap brazed repairs having localized compressive residual stresses imparted by laser shock peening.

2. Description of Related Art

A gas turbine engine includes a compressor section, a combustion section and a turbine section. Disposed within the turbine section are alternating annular stages of circumferentially disposed moving blades and stationary vanes. The rows or stages of vanes and blades are concentrically located about a center-line axis of the gas turbine engine. The blades are mounted on a disk which rotates about its central axis. Hot combustion gases exit the combustor and pass through the turbine section, whereupon the blades which are mounted on the disks rotatably drive a shaft, thus providing shaft work for driving the fan and compressor sections and auxiliary systems. Higher gas temperatures allow more work to be extracted from the gases in the turbine section, thus increasing the overall efficiency of the gas turbine engine.

The stationary vanes disposed between the stages of moving blades stabilize and direct the gas flow from one stage of rotating turbine blades to the next stage of rotating turbine blades. The stabilization and turning of the gas flow optimizes the amount of work extracted from the hot gases in the turbine section. It is very important to the efficient operation of the turbine vanes and engine to maintain the structural integrity of the nozzle and, in particular, the nozzle flow areas which are the spaces between adjacent vanes in a vane stage. Cobalt and nickel-base superalloy materials have been developed to provide mechanical strength at high temperatures so that the operating temperature capability of the turbine section is increased over the operating temperatures of prior designs. It is known to cast engine vanes from superalloys, for example, a nickel-base alloy or a cobalt-base alloy. Nickel-base superalloys are frequently primarily strengthened by precipitation of a gamma prime phase, Ni3 (Al, Ti) when used in gas turbine engines and, in particular, in turbine vanes. In addition, the casting of turbine vanes and blades is frequently performed so as to produce a directionally solidified part, with grains aligned parallel to the axis of the blade or vane or a single crystal part, with no grain boundaries.

In service, deterioration of the vane surface occurs due to oxidation, thermal fatigue cracking and metal erosion caused by abrasives and corrosives in the flowing gas stream. In addition, the high gas pressures at high temperature cause distortion of the vanes, thereby, enlarging the nozzle area with a consequent loss in turbine efficiency. During periodic engine overhauls, the vanes are inspected for physical damage and measured to determine the degree of flow area change and the effect on nozzle flow area. Before these vanes can be returned to the engine physical damage is usually repaired or the vanes replaced.

Several methods exist for repairing the worn or damaged vanes and for returning the nozzle gas flow area to acceptable dimensions within predetermined tolerances. Repair methods include, for example, conventional fusion welding, plasma spray as described in U.S. Pat. No. 4,878,953, and the use of a tape or slurry material containing a mixture of a binder and a metal alloy powder which is compatible with the substrate alloy. U.S. Pat. No. 4,878,953 provides an excellent source of background information related to methods for refurbishing cast gas turbine engine components and particularly for components made with nickel-base and cobalt-base superalloys for use in the hot sections of gas turbine engines and, more particularly, for components exposed to high temperature operating conditions.

Cracking resulting from high thermal stresses and oxidation are often repaired with a wide gap braze alloy. One particular exemplary repair method provides for filling cracks which can be as long as approximately 1.5" and as wide as approximately 0.050" in order to refurbish vanes in this manner. Trailing edges in particular are subjected to the most severe conditions, so much so that vanes can be returned from the field with missing portions of trailing edges and in many cases vanes are considered unrepairable. The HPT vane materials for the latest engines require high strength oxidation resistant single crystal and directionally solidified cast alloys. The current wide gap braze repair system for repairing vanes made of these alloys and by single crystal processes do not restore all of the these properties in the repaired areas of the vane. Further, life enhancement of the repair and vane at a low cost is therefore highly desirable. Vane replacement is very costly and there is always a need for stronger, longer lasting, and more cost effective vane repairs. It is very desirable to provide life extension of the vane and vane repair which would further approach single crystal properties, offer wider repairability limits, and make available repairs on hardware currently considered unrepairable because of excessive damage.

The present invention is directed towards this end and provides a wide gap braze repair, particularly, for a gas turbine engine vane, with regions of deep compressive residual stresses imparted by laser shock peening the area over the repair.

The region of deep compressive residual stresses imparted by laser shock peening of the present invention is not to be confused with a surface layer zone of a work piece that contains locally bounded compressive residual stresses that are induced by a hardening operation using a laser beam to locally heat and thereby harden the work piece such as that which is disclosed in U.S. Pat. No. 5,235,838, entitled "Method and Apparatus for Truing or Straightening Out of True Work Pieces". The present invention uses multiple radiation pulses from high power pulsed lasers to produce shock waves on the surface of a work piece similar to methods disclosed in U.S. Pat. No. 3,850,698, entitled "Altering Material Properties"; U.S. Pat. No. 4,401,477, entitled "Laser Shock Processing"; and U.S. Pat. No. 5,131,957, entitled "Material Properties". Laser peening, as understood in the art and as used herein, means utilizing a laser beam from a laser beam source to produce a strong localized compressive force on a portion of a surface. Laser peening has been utilized to create a compressively stressed protection layer at the outer surface of a workpiece, which is known to considerably increase the resistance of the workpiece to fatigue failure as disclosed in U.S. Pat. No. 4,937, 421, entitled "Laser Peening System and Method". However, the prior art does not disclose wide gap braze repairs of the type claimed by the present patent nor the methods of how to produce them. It is to this end that the present invention is directed.

SUMMARY OF THE INVENTION

The present invention provides a wide gap braze repair, particularly for a gas turbine engine vane or a component in the hot section of the engine. The repair is characterized by a braze filled void in a damaged area of the component, a laser shock peened surface over the repaired area of the braze filled void, and a region of deep compressive residual stresses imparted by laser shock peening (LSP) extending from the laser shock peened surface into the repair.

ADVANTAGES

Among the advantages provided by the present invention is the improved ability to better extend the useful life of gas turbine engine parts, particularly, that of turbine vanes, as compared to currently available methods. Another advantage of the present invention is that it reduces engine component and, in particular, hot section and turbine vane replacement which is very costly. The present invention provides component and vane repairs with material properties such as strength and heat resistance which more closely approach those of cast single crystal. The present invention also offers wider repairability limits and makes available repairs on hardware currently considered unrepairable because of excessive damage.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
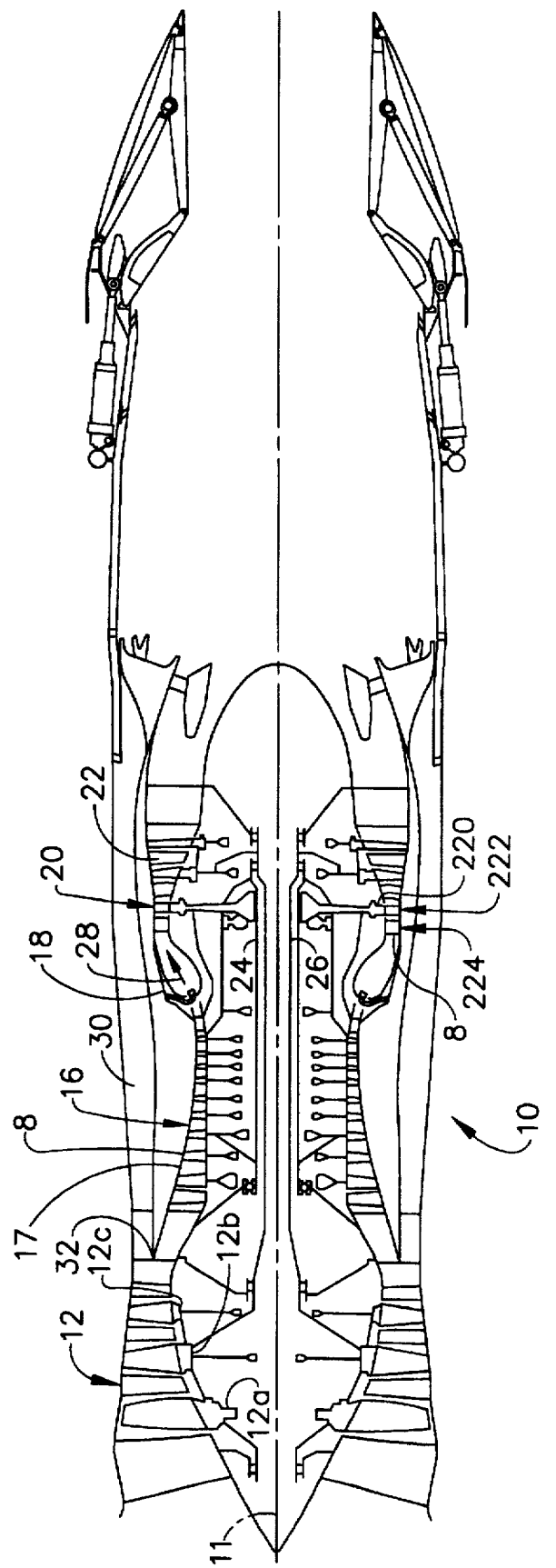
FIG. 1 is a cross-sectional illustrative view of an exemplary aircraft gas turbine engine in accordance with the present invention.

Illustrated in FIG. 1 is a schematic representation of an exemplary aircraft gas turbine engine 10 including a turbine vane 8 in accordance with the present invention. The gas turbine engine 10 is circumferentially disposed about an engine centerline 11 and has, in serial flow relationship, a fan section 12, a high pressure compressor 16, a combustion section 18, a high pressure turbine 20, and a low pressure turbine 22. The combustion section 18, high pressure turbine 20, and low pressure turbine 22 are often referred to as the hot section of the engine 10. A high pressure rotor shaft 24 connects, in driving relationship, the high pressure turbine 20 to the high pressure compressor 16 and a low pressure rotor shaft 26 drivingly connects the low pressure turbine 22 to the fan section 12. Fuel is burned in the combustion section 18 producing a very hot gas flow 28 which is directed through the high pressure and low pressure turbines 20 and 22 respectively to power the engine 10. A portion of the air passing through the fan section 12 is bypassed around the high pressure compressor 16 and the hot section through a bypass duct 30 having an entrance or splitter 32 between the fan section 12 and the high pressure compressor 16. Many engines have a low pressure compressor (not shown) mounted on the low pressure rotor shaft 26 between the splitter 32 and the high pressure compressor 16. The fan section 12 is a multi-stage fan section as are may gas turbine engines as illustrated by three fan stages 12a, 12b, and 12c. Alternating annular turbine blade stages 220 having circumferentially disposed rotatable blades 222 and vane stages 224 having the circumferentially disposed stationary turbine vanes 8.

Figure 2:
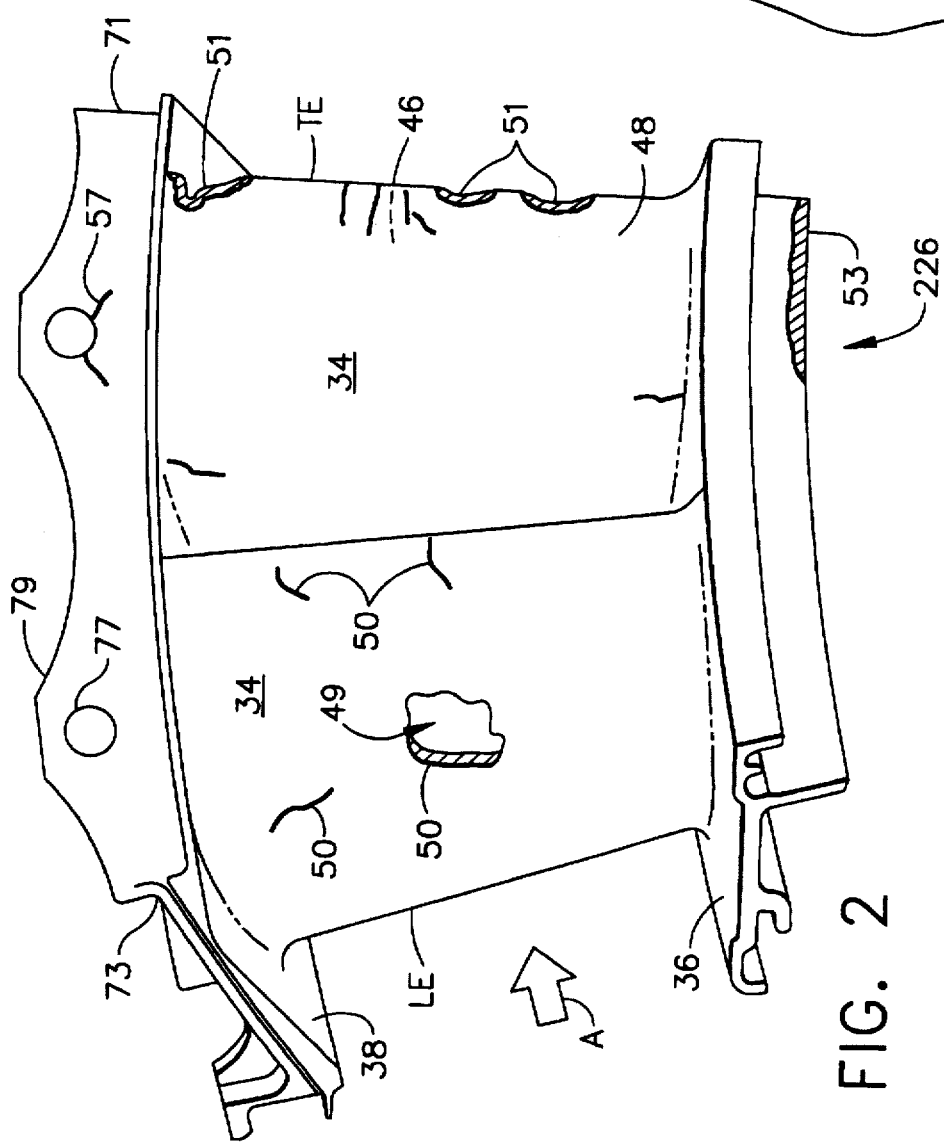
FIG. 2 is an aft looking forward perspective illustrative view of an exemplary aircraft gas turbine engine turbine vane sector.

The vane stage 224 is constructed of a plurality of vane sectors 226, as illustrated in FIG. 2, a design well known and used in the gas turbine field where vane sectors having multiple turbine vanes 8 (typically 2) are often used. Vane sectors 226 includes an airfoil 34 radially disposed between circumferentially extending inner and outer platforms 36 and 38 respectively. The airfoil 34 extends in the chordwise direction between a leading edge LE and a trailing edge TE of the airfoil. A pressure side 46 of the airfoil 34 faces in the general direction of gas flow A and a suction side 48 is on the other side or leeward side of the airfoil. Serrated flanges 71 circumferentially extend along an aft edge 73 of the outer platform 38 and have tang holes 77 formed in serrations or tangs 79 of the flanges.

Four types of typically braze repaired damages are illustrated in FIG. 2. These damages, which are illustrated by their respective repairs or braze filled voids for the purpose of this patent include, but are not limited to, the following: airfoil side cracks 50, airfoil trailing edge damage 51, platform damage 53, and tang hole damage 57. The airfoil 34 is subject to extreme thermal cycling which causes thermal fatigue and oxidation damage generated during engine operation. These repairs, even when filled with braze material 59 (illustrated in FIGS. 3 and 4), are subject to thermal fatigue failure.

It is well known in the art to construct vane sectors 226 by assembling or integrally casting the airfoil 34 and circumferentially extending inner and outer platforms 36 and 38 respectively from Cobalt and nickel-base superalloy materials. The components of or the integrally cast vane is often cast with a process to produce directionally solidified components, with grains aligned parallel to the axis of the airfoil, or a single crystal component, with no grain boundaries. The braze material 59 is preferably also made of these alloys and the braze repair does not restore all of the original properties, particularly single crystal and directionally solidified mechanical properties, in the repaired areas of the vane.

Figure 3:
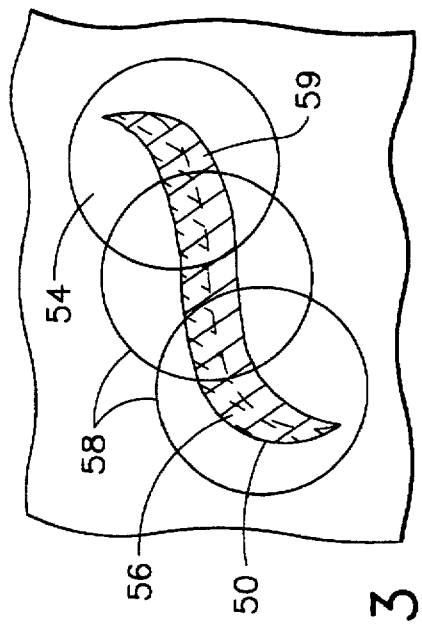
FIG. 3 is a perspective illustrative view of a turbine vane repair in accordance with the present invention.
Figure 4:
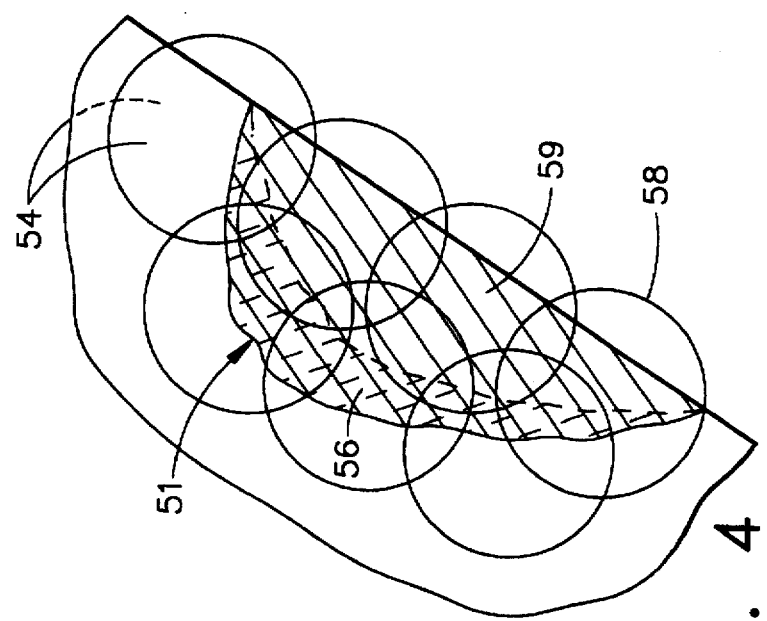
FIG. 4 is a perspective illustrative view of an alternative turbine vane repair in accordance with the present invention.

FIGS. 3 and 4 illustrate, in more detail, the repair of the present invention for the airfoil side cracks 50 and the airfoil trailing edge damage 51 respectively. To counter the loss of material and process properties and capabilities the voids represented by the side crack 50 and the airfoil trailing edge damage 51 is filled with a suitable brazed material 59. The inner surface of the voids are typically first prepared or treated and then the braze material is brazed in a suitable manner as is well known in the art as represented by the references presented herein. A portion of the surfaces, such as the sides of the vanes, encompassing the repairs represented by the side crack 50 and the airfoil trailing edge damage 51 are laser shock peened to produce laser shock peened surfaces 54 and a pre-stressed region 56 having deep compressive residual stresses imparted by laser shock peening (LSP) extending into the vane from the laser shock peened surface in the region of the braze filled void or braze repair. Preferably the pre-stressed regions 56 are extended beyond the borders of the repair into the unrepaired material of the vane. The airfoil side cracks 50 generally occur on either the pressure side 46 or the suction side 48 of the airfoil 34 and generally do not extend all the way through the side into the hollow interior 49 of the airfoil. Thus only the outer or wetted side of the airfoil need be laser shock peened but the repair could also be laser shock peened from the hollow interior of the vane using mirrors for example. The trailing edge damage 51 usually extends through the width of the airfoil along the trailing edge TE of the airfoil 34 as does its repair and braze filled void such that it is preferable to laser shock peen the trailing edge damage repair on both the pressure side 46 and the suction side 48 of the airfoil. The entire laser shock peened surface 54 is formed by overlapping laser shocked peened circular spots 58.

The laser beam shock induced deep compressive residual stresses in the compressive pre-stressed regions 56 are generally about 50–150 KPSI (Kilo Pounds per Square Inch) extending from the laser shocked peened surfaces 54 to a depth of about 20–50 mils into laser shock induced compressive residually pre-stressed regions 56. The laser beam shock induced deep compressive residual stresses are produced by repetitively firing a high energy laser beam that is focused on surface 54 which is covered with paint to create peak power densities having an order of magnitude of a gigawatt/cm$^2$. The laser beam is fired through a curtain of flowing water that is flowed over the laser shock peened surface 54 which is painted and the paint is ablated generating plasma which results in shock waves on the surface of the material. These shock waves are re-directed towards the painted surface by the curtain of flowing water to generate travelling shock waves (pressure waves) in the material below the painted surface. The amplitude and quantity of these shockwave determine the depth and intensity of compressive stresses. The paint is used to protect the target surface and also to generate plasma. Ablated paint material is washed out by the curtain of flowing water.

This and other methods for laser shock peening are disclosed in greater detail in U.S. patent application Ser. No. 08/319,346, entitled "LASER SHOCK PEENED ROTOR COMPONENTS FOR TURBOMACHINERY", and in U.S. patent application Ser. No. 08/362,362, entitled "LASER SHOCK PEENING ON THE FLY", Ser. No. 08/373,133, entitled "LASER SHOCK PEENED FAN BLADE EDGES", and U.S. patent application Ser. No. 08/399,285, entitled "LASER SHOCK PEENED GAS TURBINE ENGINE COMPRESSOR BLADE EDGES", filed December 1994, all of which are incorporated herein by reference.

While the preferred embodiment of the present invention has been described fully in order to explain its principles, it is understood that various modifications or alterations may be made to the preferred embodiment without departing from the scope of the invention as set forth in the appended claims.

We claim:

1. A method to repair damage in a gas turbine engine component wherein said damage is characterized by a void in the material of the component, said method comprising the following steps:

filling the void by brazing with a suitable braze material, laser shock peening a surface area including the void around the repair by using a laser beam with sufficient power to vaporize material on the surface area to form a region having deep compressive residual stresses imparted by the laser shock peening extending into the repair from the laser shock peened surface, and flowing a curtain of water over the surface area while the laser beam is firing until the laser shock peened surface is completely covered by laser beam spots at least once.

2. A method as claimed in claim 1 further comprising painting the surface area such that the material on the surface area is a paint suitable to generate a plasma which results in shock waves to form the region having deep compressive residual stresses.

* * * * *